(12) United States Patent
Snapp et al.

(10) Patent No.: US 8,280,745 B2
(45) Date of Patent: Oct. 2, 2012

(54) SYSTEMS AND METHODS FOR APPLYING SECONDARY INFORMATION TO BUSINESS ADDRESSES

(75) Inventors: Robert F. Snapp, Memphis, TN (US); Michael C. Garner, Collierville, TN (US); Edgar H. Gillock, II, Memphis, TN (US); James D. Wilson, Collierville, TN (US)

(73) Assignee: United States Postal Service, Washington, DC (US)

( * ) Notice: Subject to any disclaimer, the term of this patent is extended or adjusted under 35 U.S.C. 154(b) by 1259 days.

(21) Appl. No.: 11/223,027

(22) Filed: Sep. 12, 2005

(65) Prior Publication Data
US 2006/0064414 A1    Mar. 23, 2006

Related U.S. Application Data

(60) Provisional application No. 60/610,566, filed on Sep. 17, 2004.

(51) Int. Cl.
*G06Q 10/00* (2006.01)
*G06Q 30/00* (2006.01)
*H04L 9/32* (2006.01)
*G06F 7/00* (2006.01)

(52) U.S. Cl. .......... 705/1.1; 705/346; 713/176; 707/736
(58) Field of Classification Search .................... 705/1.1, 705/346; 707/736; 713/176
See application file for complete search history.

(56) References Cited

U.S. PATENT DOCUMENTS

| | | | |
|---|---|---|---|
| 5,341,505 A * | 8/1994 | Whitehouse | 708/171 |
| 5,659,731 A | 8/1997 | Gustafson | |
| 5,734,568 A * | 3/1998 | Borgendale et al. | 700/224 |
| 5,901,214 A * | 5/1999 | Shaffer et al. | 379/211.02 |
| 6,135,292 A * | 10/2000 | Pettner | 209/603 |
| 6,320,670 B1 | 11/2001 | Kenbeek | |
| 6,408,294 B1 * | 6/2002 | Getchius et al. | 707/5 |
| 6,523,021 B1 * | 2/2003 | Monberg et al. | 1/1 |
| 7,204,415 B2 * | 4/2007 | Payne et al. | 235/385 |
| 2004/0006508 A1 * | 1/2004 | Gullo et al. | 705/13 |
| 2004/0049682 A1 * | 3/2004 | Wilson et al. | 713/181 |
| 2004/0181670 A1 * | 9/2004 | Thune et al. | 713/176 |
| 2004/0211834 A1 * | 10/2004 | Fleckenstein et al. | 235/385 |
| 2004/0225543 A1 * | 11/2004 | Kapochunas et al. | 705/7 |
| 2005/0021481 A1 * | 1/2005 | Snapp et al. | 705/401 |
| 2005/0080786 A1 * | 4/2005 | Fish et al. | 707/10 |
| 2005/0086256 A1 * | 4/2005 | Owens et al. | 707/103 R |
| 2006/0004878 A1 * | 1/2006 | Lawrence et al. | 707/200 |
| 2006/0031213 A1 * | 2/2006 | Wilson et al. | 707/3 |

OTHER PUBLICATIONS

PCT International Search Report and Written Opinion mailed Mar. 17, 2006 (8 pages).

\* cited by examiner

*Primary Examiner* — Fadey Jabr
(74) *Attorney, Agent, or Firm* — Finnegan, Henderson, Farabow, Garrett & Dunner, LLP

(57) ABSTRACT

Systems and methods are provided for determining secondary address information. In one implementation, a method is provided that uses a data processing apparatus. According to the method, a code word is created for a business name and a building default extended delivery code. A data table is searched using the code word and secondary address information is revealed when a match is found between the code word and data stored in the data table.

11 Claims, 6 Drawing Sheets

101

AMERICAN AUTOMOTIVE INSURANCE COMPANY
775 YORK AVE STE 303
MEMPHIS TN 38108

FIG. 1

AUTOMOTIVE INSURANCE
775 YORK AVE
MEMPHIS TN 38108

| Record Type | ZIP Code | Primary Address | Street Name | Secondary Descriptor | Low Secondary Number | High Secondary Number | ZIP+4 Add-on Code | |
|---|---|---|---|---|---|---|---|---|
| H | 38108 | 775 | YORK AVE | | | | 1120 | Default |
| H | 38108 | 775 | YORK AVE | STE | 101 | 120 | 1121 | |
| H | 38108 | 775 | YORK AVE | STE | 201 | 220 | 1122 | |
| H | 38108 | 775 | YORK AVE | STE | 301 | 320 | 1123 | |

FIG. 3

| Record Type | ZIP Code | Primary Address | Street Name | Secondary Descriptor | Low Secondary Number | High Secondary Number | ZIP+4 Add-on Code | Default |
|---|---|---|---|---|---|---|---|---|
| H | 38103 | 123 | MAIN ST | | | | 7701 | Default |
| H | 38103 | 123 | MAIN ST | STE | 100 | 107 | 7702 | |
| H | 38103 | 123 | MAIN ST | STE | 212 | 221 | 7703 | |

FIG. 6

SYSTEMS AND METHODS FOR APPLYING SECONDARY INFORMATION TO BUSINESS ADDRESSES

RELATED APPLICATION

This application claims the benefit of priority from U.S. Provisional Application No. 60/610,566, entitled "Systems and Methods for Applying Secondary Information to Business Addresses," filed Sep. 17, 2004, the disclosure of which is expressly incorporated herein by reference in its entirety.

TECHNICAL FIELD

The present invention relates to methods and systems for applying secondary information to business addresses. In particular, methods and systems consistent with the present invention provide mailers with the ability to determine secondary address information that may be missing from an address. At the same time, data is maintained in a secure fashion such that a mailer may only access secondary address information for business addresses that are already in the mailer's possession.

BACKGROUND

One of the types of addresses to which delivery service providers deliver items is business addresses. For example, the U.S. Postal Service™ regularly delivers mail to approximately 8.4 million business addresses. Of those addresses, approximately 3.5 million are located in places such as office buildings and shopping malls where the use of a secondary address component, such as a suite or room number, is needed to assign a unique address to the delivery point of the business customer.

To improve the efficiency of mail delivery before mail is delivered, the U.S. Postal Service, through the use of automated mail processing equipment, applies an 11-digit bar code to each mailpiece to identify each address. The U.S. Postal Service then uses that bar code to sort the mail in a delivery sequence order. A postal carrier needs little or no time to prepare the sorted mail for delivery since it has already been sorted in the delivery sequence order.

A significant percentage of items destined for delivery to business customers require secondary address information to uniquely identify a delivery point. Often such items are missing secondary address information or include incorrect secondary address information. When secondary address information is missing or incorrect, the 11-digit bar code applied to the item does not provide sufficient information to sort the item into its correct place in a delivery sequence. Such an item will require additional handling by a postal carrier prior to delivery, thereby increasing the time required to serve customers on the postal carrier's route. There is a need therefore to provide mailers that specify addresses for delivery items that they send with the ability to determined second address information so that mail entering the postal system is capable of being sorted into its proper delivery sequence. Further, a mailer should only be able to access information for business addresses that are already in the mailer's possession to protect the privacy rights of customers.

SUMMARY

Systems and methods consistent with the present invention provide a mailer with the ability to determine secondary address information for records with a business name. Furthermore, systems and methods consistent with the present invention maintain data in a secure fashion that only allow a mailer to access secondary address information for business names and addresses that are already in the mailer's possession.

Consistent with an embodiment of the present invention, a method provides secondary address information using a data processing apparatus. The method comprises creating a code word for a business name and a building default extended delivery code; searching, using a processor, a data table using the code word; and revealing secondary address information when a match is found between the code word and data stored in the data table.

Consistent with another embodiment of the present invention, a method provides secondary address information using a data processing apparatus. The method comprises receiving a business name, the business name comprising one or more words; creating code words for the words in the business name; searching, using a processor, a data table using the code words; determining one or more matches between the code words and data that is stored in the data table; and when a number of the one or more matches meets or exceeds a threshold, revealing secondary address information for the business name.

Consistent with another embodiment of the present invention, a method provides secondary address information using a data processing apparatus. The method comprises determining whether an address includes secondary address information and, when the address does not include secondary address information, matching the address to a building default record; creating a code word from a business name included in the address and the building default record; creating code words for the words of the business name; searching, using a processor, a data table with the code word created from the business name and the building default record; and when a match is not found, searching the data table with the code words created from the individual words in the business name.

Consistent with yet another embodiment of the present invention, a system provides secondary address information. The system comprises a processor; a module for creating a code word for a business name and a building default extended delivery code; and a module for searching a data table using the code word and revealing secondary address information when a match is found between the code word and data stored in the data table.

Consistent with yet another embodiment of the present invention, a system provides secondary address information. The system comprises a processor; a module for receiving a business name, the business name comprising one or more words; a module for creating code words for the words in the business name, searching a data table using the code words; and a module for determining one or more matches between the code words and data that is stored in the data table, and when a number of the one or more matches meets or exceeds a threshold, revealing secondary address information for the business name.

Consistent with yet another embodiment of the present invention, a system provides secondary address information. The system comprises a processor; a module for determining whether an address includes secondary address information and, when the address does not include secondary address information, matching the address to a building default record; a module for creating a code word from a business name included in the address and the building default record; a module for creating code words for the individual words of the business name; and a module for searching a data table with the code words created from the business name and the building default record and, when a match is not found, searching the data table with the code words created from the individual words in the business name.

Consistent with still yet another embodiment of the present invention, a computer readable medium stores instructions for providing secondary address information according to any of the above described methods.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and together with the description, serve to explain the principles of the invention. In the drawings:

FIG. 1 is an example of a mailpiece with complete address information;

FIG. 2 is an example of a mailpiece with an incomplete address missing secondary information;

FIG. 3 is a data table containing exemplary records;

FIG. 6 shows exemplary records for an address processed by the exemplary system of FIG. 5.

DESCRIPTION OF THE EMBODIMENTS

Figure 4:
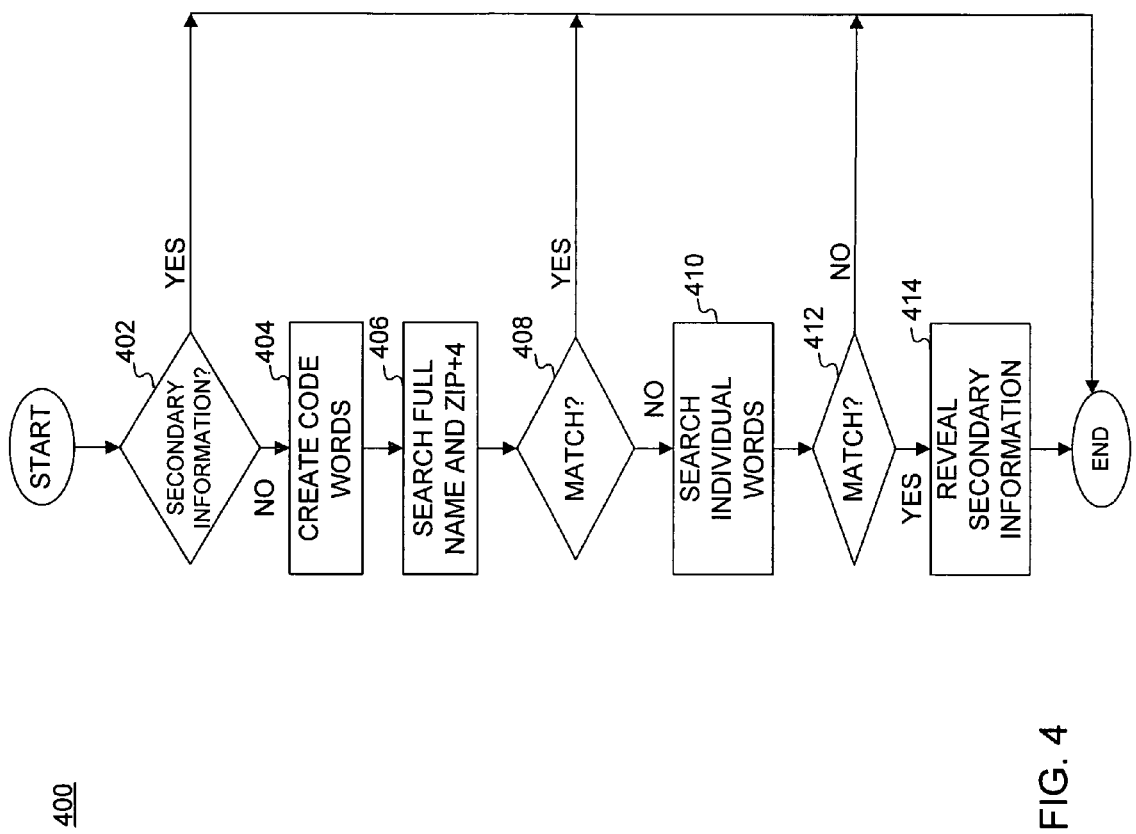
FIG. 4 is a flow diagram for a method consistent with the present invention.

In order to decrease the volume of delivery items having missing or incorrect secondary address information, the present invention improves secondary address information by relating customer names to correct, complete addresses and providing that information to mailers in a secure form so as to prevent a disclosure of information that would violate privacy laws. Although the present invention is discussed with respect to delivery items to be delivered by the U.S. Postal Service, it is to be understood that the invention may be employed with respect to other types of delivery items to be delivered by other types of delivery service providers.

Systems and methods consistent with the present invention maintain a database of business names and addresses where the delivery point addresses contain secondary address information. The database stores existing information available from private and postal sources, and may be updated by using Change of Address data received from businesses that have had a change of address. Furthermore, data that is stored in the database is arrayed in secure data tables. The structure of the data tables ensures that the data is secure and prevents an unauthorized user from learning address information improperly. For example, while an unauthorized user may be able to obtain suite numbers by examining the data, the unauthorized user would nevertheless be unable to match suite numbers to a business name or address.

When a user of the system operates mailer software to prepare mailings, the mailer software will recognize when a customer address does not match to a valid secondary address range in an address database, such as a ZIP+4 database. When that non-match is recognized, interface software creates a series of 20-byte Secure Hash Algorithm (SHA) code words. One code word represents the customer's name and address as presented by the mailer. The interface software then parses each word of the customer's name, such as a business name, and creates individual code words for each word of the name and the address. Next, the software searches secure data tables that include records of business names from delivery service provider data files, and records including each word of the business names and addresses.

To gain access to the data stored in the data tables, the name of a particular business, the individual words that make up the name of the business, and the default ZIP+4 Code assigned to the building are used as authorizing data. The information is processed using the Secure Hash Algorithm (SHA-1) to produce a unique 20 byte object. When the software queries the data tables with the authorizing data, data is revealed. The revealed data constitutes the second address information such as, for example, a suite number for a specific business located at a specific address.

In addition, due to the secure nature of the data, the mailer is unable to obtain a list of residents or tenants, or the number of suites that are located at a particular address. Since the revealed data provides the secondary address information to the mailer, the mailer may determine a complete address for many customers for whom they now have only a partial address. By increasing the accuracy of secondary address information for delivery items, such as business mail, a delivery provider such as the U.S. Postal Service, is therefore able to more quickly deliver the mail since it may be quickly sorted into a delivery sequence order.

Reference will now be made in detail to embodiments of the present invention, examples of which are illustrated in the accompanying drawings. Wherever possible, the same reference numbers will be used throughout the drawings to refer to the same or like parts.

FIG. 1 is an example of a delivery item, such as a mailpiece 101, that includes an address that is complete. The address includes all of the information contained in a typical address. For example, addresses may include primary address information, such as street numbers and names, and secondary address information, such as suite or room numbers. The example shown in FIG. 1 is a complete address that includes secondary address information. In the address, 775 YORK AVE is primary address information, while STE 303 is secondary address information.

By having both the primary address information and the secondary address information, it is possible to determine an add-on code, which may be added to a delivery code such as a ZIP Code™, to form an extended delivery code, such as a ZIP+4 Code™. Accordingly, a ZIP+4 Code may be added to mailpiece 101. The ZIP+4 Code may be added, for example, in the form of a bar code on mailpiece 101.

However, secondary address information is frequently missing from a mailpiece. When secondary address information is missing, it becomes more difficult for the U.S. Postal Service to place the mailpiece in sequential order prior to delivery so that a carrier can efficiently deliver the mail in sequence. Turning to FIG. 2, an example is shown of a mailpiece 201 with an incomplete address. The address shown in FIG. 2 is missing secondary address information. Specifically, in this example, only 775 YORK AVE is specified, and the secondary address component (suite number) has been omitted. As a result, it may prove more difficult to sort the mailpiece in proper order for delivery.

The U.S. Postal Service maintains, to store address information, an Address Management System (AMS) database that includes records for all addresses and their corresponding extended delivery codes, in the format of ZIP+4 Codes. The ZIP+4 Code is the five-digit ZIP Code, plus an additional four-digit code. When four or more business entities have a common primary address, and the addresses are differentiated by secondary address information, the building is assigned one or more distinct ZIP+4 Codes. In a similar fashion, when mail is delivered into multiple clusters of receptacles, a ZIP+4 Code is assigned to each cluster. Yet in a further similar fashion, when mail is delivered to multiple floors within a high-rise building, each floor may be assigned a unique ZIP+4 Code.

AMS records assigned under these requirements are identified with a Record Type code of "H." In order to receive the unique ZIP+4 Code for a cluster of receptacles or for a specific floor, the address in question must contain the secondary address component. The AMS database will also store a record for each building as a whole. This record is known as the Building Default, and is used to capture addresses with missing or erroneous secondary address information. Periodically, such as on a weekly basis, information is extracted from the AMS database and compiled into a software product (discussed below). The software product is then made available to mailers.

FIG. 3 shows a data table containing exemplary AMS records. For example, the data table shows records including four-digit add-on codes for a building at 775 YORK AVE in Memphis, Tenn. Consider the complete address shown in FIG. 1 and the incomplete address shown in FIG. 2. Software used by a mailer to assign a ZIP+4 Code (which is a nine-digit ZIP Code) to addresses will assign different codes to these addresses, even though the intended recipient is the same company in the same building. For example, the complete address shown in FIG. 1 will be assigned its correct ZIP+4 Code of 38108-1123. The incomplete address shown in FIG. 2 will be assigned the Building Default code of 38108-1120. The Building Default code is assigned to all addresses that are incomplete. That is, an address that does not include secondary address information will be assigned the Building Default code.

Software used by a mailer may also calculate a Delivery Point Code. This is a two-digit number which, when appended to the ZIP+4 Code, will usually uniquely identify a complete address. For example, the complete address of FIG. 1 will be assigned the Delivery Point Code that is unique to STE 303, which is 78. The mail piece will then receive a bar code representing the complete ZIP+4 Code and Delivery Point Code, 38108-1123-78. This bar code will allow automated mail sorting equipment to sort the mail using U.S. Postal Service mail processing systems into a correct delivery sequence.

However, an incomplete address that is missing secondary information will not uniquely identify the delivery point of the mail recipient. For example, all mail assigned the Building Default ZIP+4 Code will receive a common delivery point code (99) and will be sorted together. Accordingly, the mail will require additional handling by a carrier before it can be delivered. It will also increase the chances that the mail will not be delivered if the carrier cannot associate the name with a specific mail receptacle.

Process for Determining Secondary Address Information

The present invention may be used to determine secondary address information for an incomplete address. Consistent with the present invention, a software product (discussed below) includes a database of customer names, which have been gathered from various sources and have been associated with individual addresses in cases where the record type is "H" in the AMS database. The software product also stores, in a Secure Hash Algorithm (SHA), an entry for the entire company name and ZIP+4 Code, and an additional entry for each word of the company name and ZIP+4 Code. SHA-1 is a revision of the original Secure Hash Algorithm and computes a condensed representation of a message or a data file. When a message of any length less than $2^{64}$ bits is received as an input, the SHA-1 algorithm creates a 160-bit output code word called a message digest. The SHA-1 algorithm is secure because it is computationally infeasible to extract a message that corresponds to a given message digest, or to provide two different messages that produce the same message digest.

FIG. 4 shows a flow diagram 400 for a method consistent with the present invention. First, it is determined whether an address contains secondary address information, as shown by step 402. If the address contains secondary address information, then the address is complete and the process ends. If the address does not contain secondary address information, however, then the mailer's software will match the address to a building default record. Processing will continue to determine the correct secondary address information by proceeding to step 404.

In step 404, a 20-byte code word is created for the business name and the building default ZIP+4 Code, which will be used to probe the data tables, and additional 20-byte code words are created using each individual word of the business name. Next, processing proceeds to step 406. In step 406, a data table is first searched using the code word created from the full business name and the building default ZIP+4 Code. It is then determined whether there is a match, as shown by step 408. If the search using the full business name and the building default ZIP+4 Code does not locate a match, processing proceeds to step 410. In step 410, the table is searched using the code words created from each individual word in the business name and the building default ZIP+4 Code.

Next, in step 412, it is determined whether there is a match. If there are no matches, processing ends and the building default record is used. If the method reveals that the input code words match to a code word stored for an address in the data file, the method will reveal the secondary address that is associated with the code word, as shown by step 414. If there is more than one secondary address associated with a given code word, each of the secondary address numbers will be revealed. The method can then append the suite number to the address and supply the correct ZIP+4 Code and Delivery Point Code for that customer.

Exemplary System for Distributing Software

Figure 5:
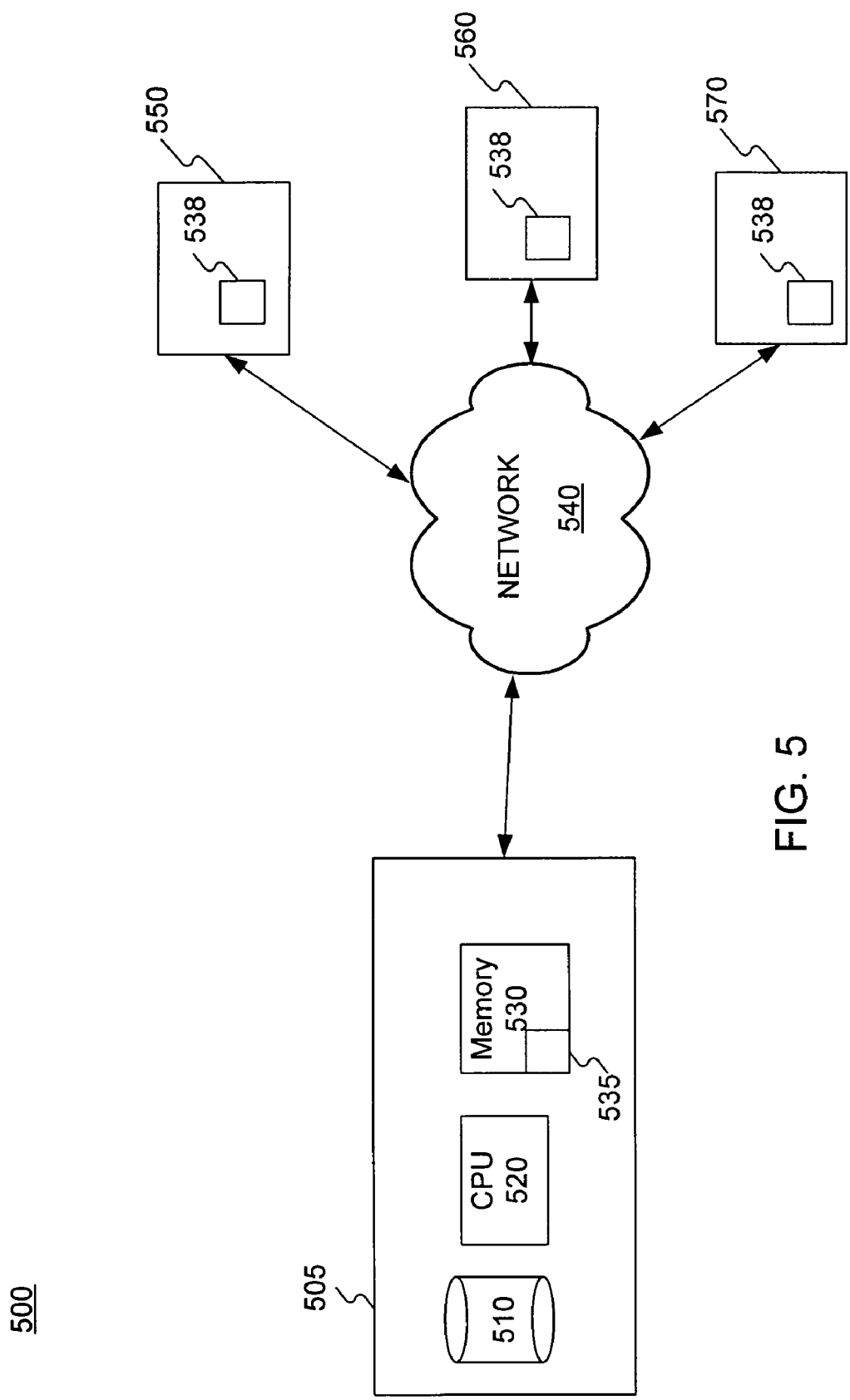
FIG. 5 is a diagram of an exemplary system consistent with the present invention.

FIG. 5 is an exemplary system 500, consistent with embodiments of the invention, for providing a software product and software updates to mailers. System 500 includes a server 505, with a database 510, a CPU 520, and a memory 530, which is connected to a network 540. As described above, on a periodic basis, information may be extracted from database 510 and compiled into a software product, which is then made available to mailers.

Network 540 provides communications between the various components in system 500, such as user terminals 550-570. Network 540 may be a shared, public, or private network and encompass a wide or local area. A distribution application 535 in memory 530 distributes a client application 538 and updates to user terminals 550-570 over network 540.

Client application 538 may comprise, for example, a module for receiving a name of a customer and an address of the customer, a module for creating code words for each word of the name and the address, a module for searching a data table for data that matches the code words, and a module for providing second address information for the customer when a number of matches between data in the data table and the code words meets or exceeds a threshold. Other variations and modules for implementing the process described above are contemplated and consistent with the scope of the present invention.

Terminals 550-570 allow a user, such as a mailer, to send and/or receive information to/from server 505. Terminals 550-570 may be any type of appropriate device for communicating with server 505 over network 540. For example, terminal 550 may be a personal digital assistant (PDA) running a program for communicating with server 505, while terminal 560 may be a desktop computer running a web browser for communicating with server 505 via the Internet. Optionally, any one of terminals 550-570 may be standalone terminals, such a desktop computers, and may receive updates by loading software from a CD-ROM or other appropriate media.

To receive client application 538, a mailer may access server 505 via network 540 or operate a web browser or software running on terminal 550. Data may be sent over network 540 to and from server 505 to terminal 550 during the updating process. For example, a mailer may periodically log into a website using terminal 550, and may optionally provide authentication credentials, such as a username and password, to receive software updates. Mailers may also select an option whereby updates are automatically provided as needed or on a periodic basis. Alternatively, software updates may be provided on media, such as a CD-ROM, that is distributed to mailers.

Once any necessary software updates are provided to any one of terminals 550-570, terminals 550-570 may execute client application 538 to determine secondary address information. For example, a mailer that operates terminal 550 may store address information for recipients to which he mails items in a memory (not shown) included in a terminal. To update the addresses, the mailer may execute client application 538 to determine secondary address information in a manner consistent with the present invention.

The following provides an example:

At 123 Main St Memphis Tenn. 38103, there are five businesses. They are:
Memphis Automotive Sales in Suite 100
Automotive Insurance of Tennessee in Suite 104
Tennessee State Home Sales in Suite 107
Home Insurance of West Tennessee in Suite 212
West Memphis Home Care Solutions in Suite 221

In this example, a mailer may attempt to mail a letter destined for Tennessee State Home Sales using the following incomplete address:
TENNESSEE HOME SALES
123 MAIN ST
MEMPHIS TN 38103
(Note that the word "State" is missing from the name of the business entity in the incomplete address.)

FIG. 6 shows exemplary records for the address used by the exemplary system of FIG. 5. The address, "123 Main St," is maintained in a ZIP+4 database (not shown). An address of "123 Main St Ste 104" will be assigned a ZIP+4 Code of 38103-7702. An address of "123 Main St Ste 212" will be assigned a ZIP+4 Code of 38103-7703. An address of "123 Main St" will be assigned a ZIP+4 Code of 38103-7701. The ZIP+4 Code 38103-7701 is the default code for the building, and is assigned by client application 538 when a suite number is missing from the input address, or is present but outside the range of the ZIP+4 records with secondary ranges.

Client application 538 will contain a database (not shown) including the following for the address in question:
Memphis Automotive Sales 38103-7701, 100
Automotive Insurance of Tennessee 38103-7701, 104
Tennessee State Home Sales 38103-7701, 107
Home Insurance of West Tennessee 38103-7701, 212
West Memphis Home Care Solutions 38103-7701, 221
Memphis 38103-7701, 100, 221
Automotive 38103-7701, 100, 104
Sales 38103-7701, 100, 107
Insurance 38103-7701, 104, 212
Tennessee 38103-7701, 104, 107, 212
State 38103-7701, 107
Home 38103-7701, 107, 212, 221
West 38103-7701 212, 221
Care 38103-7701, 221
Solutions 38103-7701, 221

Client application 538 will assign the default ZIP+4 Code to the above address, resulting in:
TENNESSEE HOME SALES
123 MAIN ST
MEMPHIS TN 38103-7701

During processing of the address, if an input address matches to the default ZIP+4 code for the building, client application 538 would recognize the fact that the default code was assigned, and would then create code words for the following data:
TENNESSEE HOME SALES 381037701
TENNESSEE 381037701
HOME 381037701
SALES 381037701

Client application 538 would then attempt to match TENNESSEE HOME SALES 381037701 with the data stored in its database. Because there is no exact match for that name at that address (the word "State" is missing), the match attempt would fail. The software would then attempt to match each word individually. Code word matching for TENNESSEE would reveal three associated suite numbers: 104, 107 and 212. Code word matching for HOME would reveal three associated suite numbers: 107, 212, and 221. Code word matching for SALES would reveal two associated suite numbers: 100 and 107. There is one suite number, 107, that is common to all three input code words. The software would assign Suite 107 as the secondary address for Tennessee Home Sales at the address in question, which would then allow the software to assign the best possible ZIP+4 Code and Delivery Point bar code. The process thus results in an assignment of the most accurate bar code possible for the mailpiece bearing that address.

Rules may be used to set thresholds regarding the matching of business names using the above-described systems and methods. For example, it may be considered sufficient to conclude that a match has occurred once a suite number is found that is in common to a predetermined number of words in an address. A match may thus occur when a threshold value of code words having the same suite number is reached or exceeded.

As broadly described herein, systems and methods consistent with the present invention provide a mailer with the ability to determine secondary address information for records with a business name. Data is secured so that a mailer may only access secondary address information for business names and addresses that are already in the mailer's possession.

The foregoing descriptions of the invention have been presented for purposes of illustration and description. They are not exhaustive and do not limit the invention to the precise form disclosed. Modifications and variations are possible in light of the above teachings or may be acquired from practicing of the invention. For example, the described implementation includes software but the present invention may be implemented as a combination of hardware and software or in hardware alone. Additionally, although aspects of the present invention are described as being stored in memory, one skilled in the art will appreciate that these aspects can also be stored on other types of computer-readable media, such as secondary storage devices, like hard disks, floppy disks, a CD-ROM, or other forms of RAM or ROM. The scope of the invention is defined by the claims and their equivalents.

Other embodiments of the invention will be apparent to those skilled in the art from consideration of the specification and practice of the invention disclosed herein. The specification and examples should be considered as exemplary only, with a true scope and spirit of the invention being indicated by the following claims.

What is claimed is:

1. A method for providing secondary address information using a data processing apparatus, the method comprising:
   determining, by a processor, whether an address includes secondary address information and, when the address does not include secondary address information, assigning a building default extended delivery code to the address;
   creating a words from each word in a business name included in the address and the assigned building default extended delivery code;
   searching, using a processor, a data table using the code words; and
   revealing secondary address information when a match is found between at least one of the code words and data stored in the data table.

2. The method of claim 1, wherein the data stored in the data table is maintained in a secure form.

3. The method of claim 1, wherein the data table is stored in a server, the server being connected to the data processing apparatus over a network.

4. The method of claim 1, wherein the building default extended delivery code is a ZIP+4 Code.

5. A system for providing secondary address information, the system comprising:
   a processor; and
   a memory storing instructions that, when executed by the processor, cause the processor to perform operations comprising:
      determining whether an address includes secondary address information and, when the address does not include secondary address information, assigning a building default extended delivery code to the address,
      creating code words from each word in a business name included in the address and the assigned building default extended delivery code, and
      searching a data table using the code words and revealing secondary address information when a match is found between at least one of the code words and data stored in the data table.

6. The system of claim 5, wherein the data stored in the data table is maintained in a secure form.

7. The system of claim 5, wherein the extended delivery code is a ZIP+4 Code.

8. The system of claim 5, further comprising:
   a network; and
   a server connected to the system over the network, wherein the data table is stored in the server.

9. A computer-readable storage medium storing instructions for causing a processor to perform a method for providing secondary address information, the method comprising the steps performed by the processor of:
   determining whether an address includes secondary address information and, when the address does not include secondary address information, assigning a building default extended delivery code to the address;
   creating code words from each word in a business name included in the address and the assigned building default extended delivery code;
   searching, using a processor, a data table using the code words; and
   revealing secondary address information when a match is found between at least one of the code words and data stored in the data table.

10. The computer-readable storage medium of claim 9, wherein the data stored in the data table is maintained in a secure form.

11. The computer-readable storage medium of claim 9, wherein the data table is stored in a server, the server being connected to the data processing apparatus over a network.

* * * * *